(12) United States Patent
Bernard et al.

(10) Patent No.: US 10,232,686 B2
(45) Date of Patent: Mar. 19, 2019

(54) SUN VISOR WITH SLIDE ON ROD FUNCTION

(71) Applicant: Grupo Antolín Ingeniería, S.A.U., Burgos (ES)

(72) Inventors: Vincent Bernard, Vosges (FR); Patrick Georges, Vosges (FR); Ignacio Marcos Primo, Burgos (ES)

(73) Assignee: GRUPO ANTOLÍN INGENIERÍA, S.A.U., Burgos (ES)

( * ) Notice: Subject to any disclaimer, the term of this patent is extended or adjusted under 35 U.S.C. 154(b) by 0 days.

(21) Appl. No.: 15/605,423

(22) Filed: May 25, 2017

(65) Prior Publication Data

US 2017/0341492 A1    Nov. 30, 2017

(30) Foreign Application Priority Data

May 27, 2016    (EP) ..................................... 16382238

(51) Int. Cl.
*B60J 3/02*    (2006.01)
(52) U.S. Cl.
CPC ........... *B60J 3/0239* (2013.01); *B60J 3/0265* (2013.01); *B60J 3/0278* (2013.01)
(58) Field of Classification Search
CPC ....... B60J 3/0239; B60J 3/0234; B60J 3/0265
USPC ................... 206/97.1, 97.11–97.12
See application file for complete search history.

(56) References Cited

U.S. PATENT DOCUMENTS

| | | | |
|---|---|---|---|
| 5,139,303 A | | 8/1992 | Miller |
| 7,032,949 B1 * | | 4/2006 | Wang ..................... B60J 3/0239 296/97.5 |
| 7,798,551 B2 * | | 9/2010 | Okazaki ................. B60J 3/0265 296/97.11 |
| 7,798,552 B2 | | 9/2010 | Takai |
| 8,333,422 B2 | | 12/2012 | Ogawa et al. |
| 8,434,811 B2 | | 5/2013 | Rockafellow et al. |

(Continued)

FOREIGN PATENT DOCUMENTS

EP    2711760 A1 *    3/2014    ............ B60J 3/0239
WO    2014132569 A1    9/2014

OTHER PUBLICATIONS

European Search report dated Nov. 23, 2016 re: Application No. EP 16 38 2238; pp. 1-7; citing: WO 2014/132569 A1, US 2006/267369 A1 and US 5 139 303 A.

*Primary Examiner* — Dennis H Pedder
(74) *Attorney, Agent, or Firm* — Cantor Colburn LLP (57) ABSTRACT

A sun visor includes a screen slidably mounted over a shaft attachable to a vehicle. A guiding profile is mounted in the screen, and a slider is rotatably mounted over the shaft and housed inside the guiding profile such that the guiding profile can slide longitudinally over the slider to establish a slide on rod function for the sun visor. A detent spring clip is attached to the slider and engages elastically over the shaft of the sun visor such that upon rotation of the screen of the sun visor, it is possible to establish a shading position and an inoperative position for the sun visor. The detent spring clip includes an asymmetrical shape to fit to an asymmetrical core shape of the slider in a single position. The slider includes an asymmetrical external shape to fit to an asymmetrical internal shape of the guiding profile in a single position. The guiding profile includes an asymmetrical external shape to fit to an internal shape of the screen in a single position.

12 Claims, 10 Drawing Sheets

(56) References Cited

U.S. PATENT DOCUMENTS

| | | | |
|---|---|---|---|
| 8,845,000 B2 | 9/2014 | Asai et al. | |
| 9,186,962 B2 * | 11/2015 | Huff | B60J 3/023 |
| 2006/0267369 A1 | 11/2006 | Kearns et al. | |

* cited by examiner

SUN VISOR WITH SLIDE ON ROD FUNCTION

CROSS-REFERENCE TO RELATED APPLICATIONS

This application is related to and claims the benefit of Spanish Patent Application No. EP 16382238, filed on May 27, 2016, the contents of which are herein incorporated by reference in their entirety.

TECHNICAL FIELD

The disclosure is related to sun visors for vehicles, especially sun visors with slide on rod function. The sun visor can be double shelled or skeleton structure.

BACKGROUND

Sun visors for vehicle are known in the art which comprise a body or screen, rotatably mounted over a shaft attachable to the vehicle structure. The screen can be a doubled shelled structure (two shells assembled to constitute the structure and the external shape of the screen, sometimes twin shells) or an skeleton structure (the structure is done by a plastic part, sometimes enhanced with a wireframe, and coated externally with two foams). The plastic part structure can be a single piece or constituted by more than one piece. The screen can be a plastic or a cardbox screen. The screen can be upholstered.

The user (driver) folds down the sun visors screen (when needed) to a position which prevents the glare. This position must be adjustable in regard to the relative position of the sun and the eye of the driver. In the selected position, the user can release the screen and the position must be maintained, whichever the vibrations given by the running car. To maintain this position, a friction torque must be applied between the screen and the shaft. This friction torque is generated by a metallic pincer (detent spring clip), generally hold in the screen. The detent spring is fixed to the screen and elastically engaged over the shaft such that when the screen is rotated the detent spring rotates around the shaft, generating the friction torque.

At the same, when the sun visor is of no use, the user can fold it up against the headliner. In this situation, the detent spring clip encounters a flat surface, generated on the shaft, and by clamping on the edge of the flat surface, it generates a fold-up torque which automatically folds-up the screen against the headliner (and prevents the screen form vibrating and generating noise).

Sun visors with a slide on rod function (to covert the most lateral glares) comprise a slider mounted to the shaft so that the slider can slide longitudinally in a pathway generated in the structure of the screen. The slider holds the detent spring clip which clamps the shaft such that the shaft can rotate inside the detent spring clip (the detent spring clip is fix in rotation relative to the slider and the screen) and generates the torques and detent forces, but is fixed longitudinally on the shaft. When pulling the screen, the screen slides longitudinally over the slide, but that way the weight of the sunvisor rests upon the edge of the shaft such that, if the engagement between the shaft and the screen is not strong enough the vibrations produced by the vehicle are transmited to the sun visor which can move excessivelly and even enter in resonance.

The sun visor usually comprises a guiding hollow structure or guiding profile (sometimes a tube) mounted in a pathway of the screen of the sun visor to improve the sliding between the slider and the screen. The slider usually slides inside the tube.

A problem in the art is that for establishing the inoperative position of the sun visor the detent spring clip must cooperate with a flat surface of the shaft. For that reason the detent spring clip is usually an asymmetric spring with a longer side for friction over the rounded surface of the shaft and a smaller side for attaching upon the flat surface (the width of this flat surface is adapted to the detent spring clip size) so that the force to change from one position to the other is not too high. As the detent spring clip is not symmetric it must be mounted over the shaft in the right position/orientation to establish correctly the two positions for the sun visor. The detent spring clip must be installed in one and only one direction (it can't be installed in an opposite way). If the détente spring clip is mounted with the wrong orientation the flat surface effect would not append at the proper angle (it will completely disturb the fold-up torque and angle).

Furthermore the guiding profile is usually symmetrical, which means that it can be installed inside the structure (skeleton or double shelled) in both directions, in a right or wrong position.

The slider itself can also be introduced inside the guiding profile in both sides, too, which means that the correct position/orientation of the detent spring clip must be checked and confirmed during the assembly operations.

The above difficulty is increased by the fact that the vehicles have (practically) always two symmetrical sun visors; one left hand side sun visor and one right hand side sun visor. The main components of these sun visors are symmetrical, too (double shells, skeleton, shaft, etc. . . . ) which means that it is possible to install a left hand slide on rod device in a right hand sun visor in a right or wrong position.

Sun visors with a slide on rod function are disclosed for example in U.S. Pat. No. 8,434,811-B2, U.S. Pat. No. 8,845,000-B2, U.S. Pat. No. 8,333,422-B2, and U.S. Pat. No. 7,798,552-B2.

DESCRIPTION OF THE DISCLOSURE

To ensure the correct position/orientation of the detent spring clip over the shaft without double-checks during the assembly, the present disclosure proposes a non-symmetric assembly. This will ensure that the detent spring clip will be assembled in only one way to guarantee that the clip will be always in the good orientation (position), whichever the sun visor type and side (left hand or right hand).

According to the disclosure some of the parts of the sun visor have an asymmetric profile or shape, establishing a chain of asymmetries during the assembly of the sun visor that assure a correct assembly. The guiding profile, preferably tubular, has an asymmetric exterior shape and the screen has an interior asymmetric shape that fit each other such that the guiding profile can only be mounted on the sun visor screen in one position/orientation.

The slider has an asymmetric exterior shape and the guiding profile an asymmetric interior shape that fit each other so that the slider can only be mounted inside the guiding profile in one position/orientation. The detent spring clip has an asymmetric shape and the slider has an asymmetric core shape that fit each other so that the detent spring can only be mounted on the slider in one position/orientation. This chain of asymmetries prevents the mounting of the guiding profile (tube), slider and detent spring clip in a wrong position. The disclosure also allows and facilitates an automatic assembly process of the sun visor.

This solution is valid for doubled shelled sun visors (double/twin shell) and for skeleton sun visors.

The disclosure relates to a sun visor comprising:
a screen, slidably mounted over a shaft attachable to the vehicle;
a guiding profile mounted in the screen;
a slider rotatably mounted over the shaft and housed inside the guiding profile such that the guiding profile can slide longitudinally over the slider to establish a slide on rod function for the sun visor; and
a detent spring clip attached to the slider and engaging elastically over the shaft of the sun visor such that upon rotation of the screen of the sun visor is possible to establish a shading position and an inoperative position for the sun visor.

According to the disclosure,
the detent spring clip comprises an asymmetrical shape to fit to an asymmetrical core shape of the slider in a single (exclusive) position,
the slider comprises an asymmetrical external shape to fit to an asymmetrical internal shape of the guiding profile in a single (exclusive) position, and
the guiding profile comprises an asymmetrical external shape to fit to an asymmetrical internal shape of the screen in a single (exclusive) position.

In some embodiments, the screen is made up of two shells (double shelled screen), the shells comprising first longitudinal ribs to fit with longitudinal grooves of the external shape of the guiding profile.

In some embodiments, the screen is made up of two shells and the guiding profile further comprises a clip or arm for attachment to the shells.

In some embodiments, the clip or arm is a symmetric clip, preferably a T shaped clip with two wings, which can for fit in second longitudinal ribs of the interior shape of the shells. In some embodiments the clip comprises elastic ribs to improve the engagement.

In some alternative embodiments, the clip or arm is asymmetrical to fit with asymmetrical longitudinal ribs of the shells. The clip can be an L shaped clip, with one asymmetrical wing. This asymmetrical clip can be the only external asymmetrical shape of the guiding profile. The clip can also be a further asymmetric element to the first longitudinal ribs and grooves. The L shaped clip can comprise elastic ribs to improve the engagement.

In some embodiments, the screen is made up of a skeleton, the skeleton comprising two asymmetrical structures to engage in asymmetric edges of the guiding profile.

The guiding profile can be a closed profile or an open profile.

BRIEF DESCRIPTION OF THE DRAWINGS

To complete the description and in order to provide for a better understanding of the disclosure, a set of drawings is provided. Said drawings form an integral part of the description and illustrate embodiments of the disclosure, which should not be interpreted as restricting the scope of the disclosure, but just as examples of how the disclosure can be carried out. The drawings comprise the following figures:

FIGS. 6A and 6B are perspectives of a guiding profile engaged in a screen of a doubled shell sun visor. In FIG. 6A one of the shells has been removed for clarity.

DETAILED DESCRIPTION OF THE DRAWINGS

Figure 1:
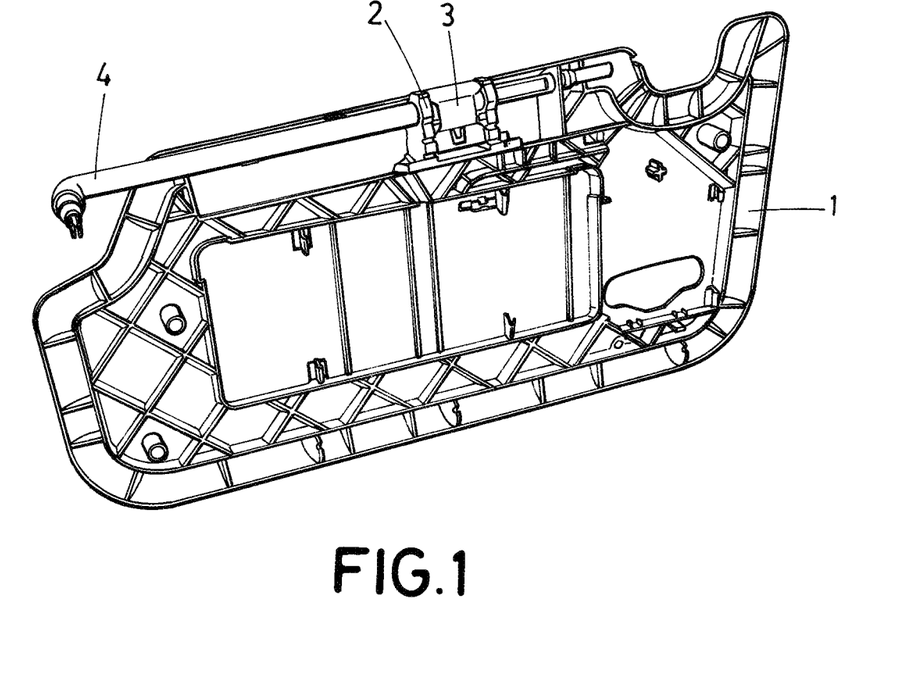
FIG. 1 is a perspective of a doubled shelled sun visor with slide on rod function comprising a slider, a detent spring clip and a shaft. The guiding tube is not illustrated and only one of the shells has been represented for clarity.

FIG. 1 illustrates a sun visor with slide on rod function comprising a screen (1) a slider 2, a detent spring clip 3 and a shaft 4. The sun visor is a doubled shelled sun visor but only one of the shells has been represented for clarity.

Figure 2:
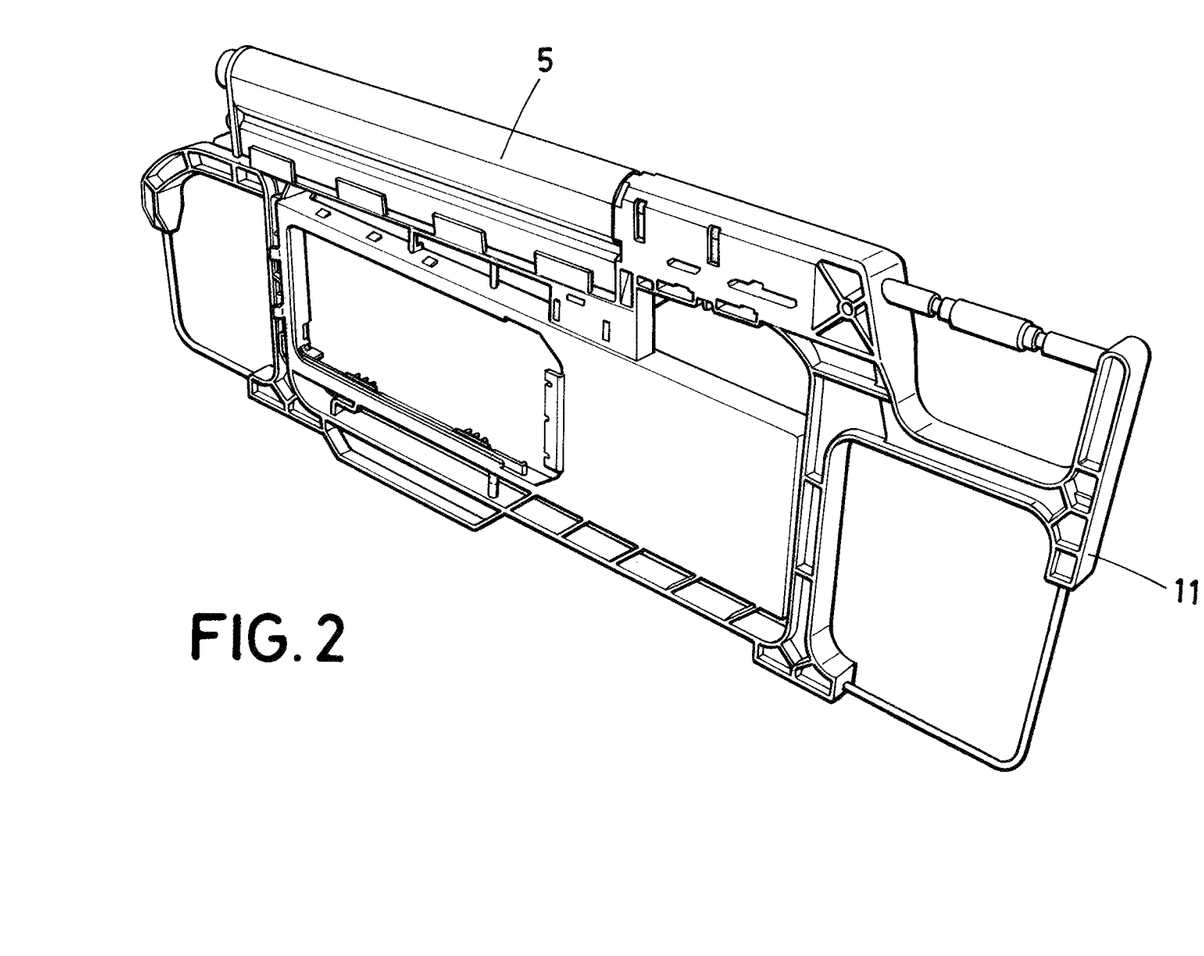
FIG. 2 is a perspective of a guiding tube attached to the structure of a skeleton sun visor with slide on rod function. The shaft has been removed for clarity.

FIG. 2 illustrates a sun visor with slide on rod function comprising a screen 11 and a guiding profile 5. The sun visor is a skeleton sun visor. The shaft has not been represented for clarity.

Figure 3:
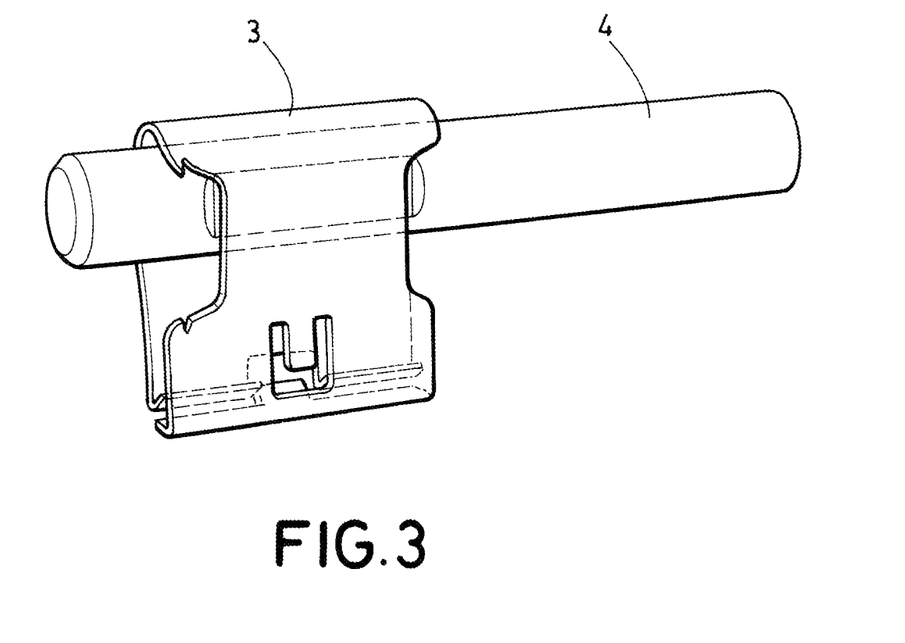
FIG. 3 is a perspective of a detent spring clip engaged in a shaft.
Figure 4:
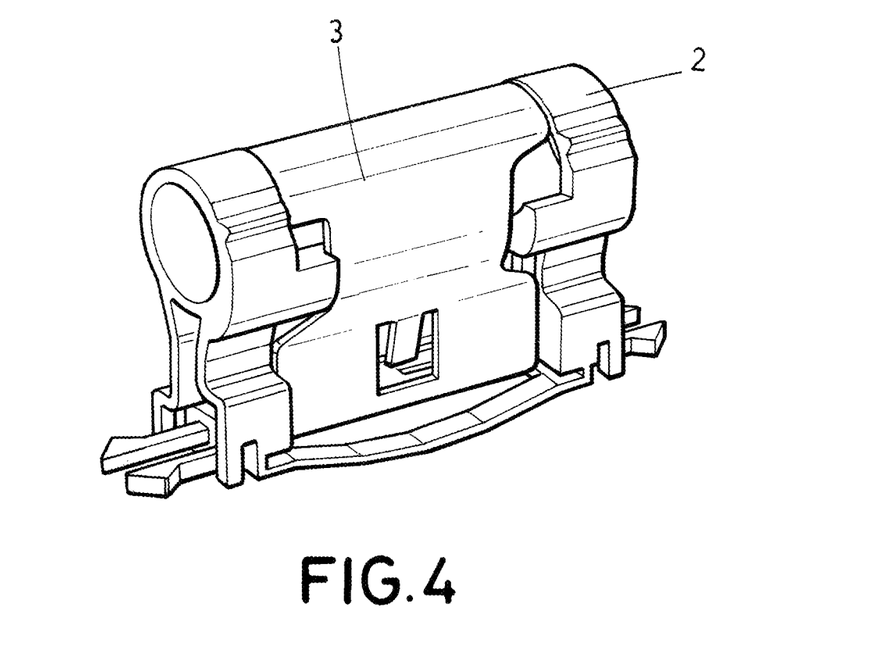
FIG. 4 is a perspective of a slider and detent spring clip as per the disclosure.

As can be seen in FIG. 3 the detent spring clip 3 is asymmetric to engage upon a flat surface of the shaft. FIG. 4 illustrates an slider 2 with an asymmetric core such that the detent spring clip 3 can only be mounted in the slider 2 in a single and exclusive position. That means that according to the disclosure the detent spring clip 3 cannot be mounted in a wrong position or orientation in the slider 2.

Figure 5:
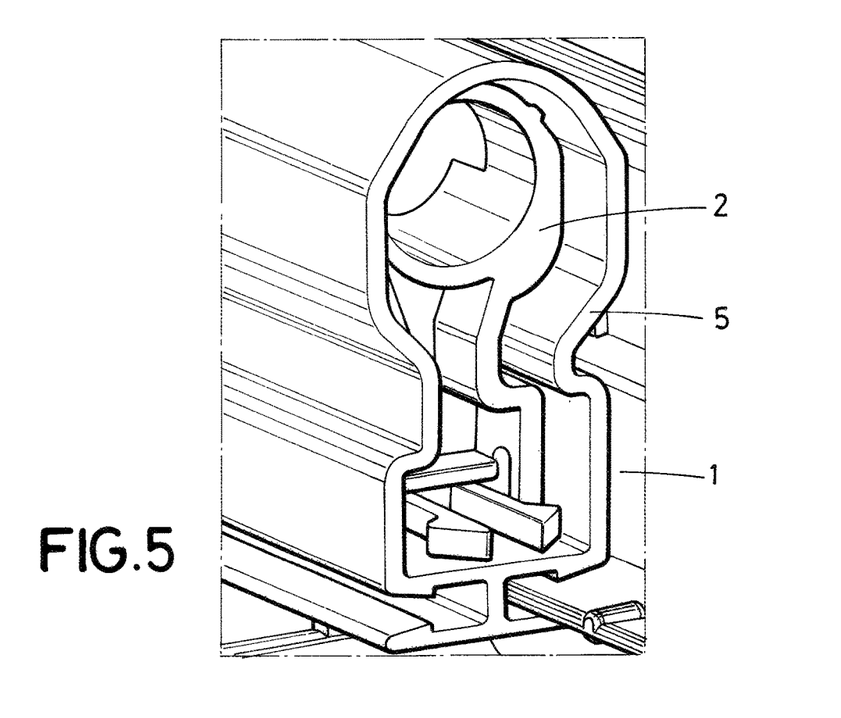
FIG. 5 is a perspective of a guiding profile engaged to a screen, and a slider inside the guiding profile.

FIG. 5 illustrates a slider 2 inside a guiding profile 5. As can be seen in this figure the slider 2 has an asymmetric external shape and the guiding profile 5 an asymmetrical internal shape. According to the disclosure the external shape of the slider 2 and the internal shape of the guiding profile 5 are such that the slider 2 fits inside the guiding profile only in an exclusive position or orientation. That means that the slider 2 cannot be mounted in a wrong position or orientation inside the guiding profile 5.

Figures 6A, 6B:
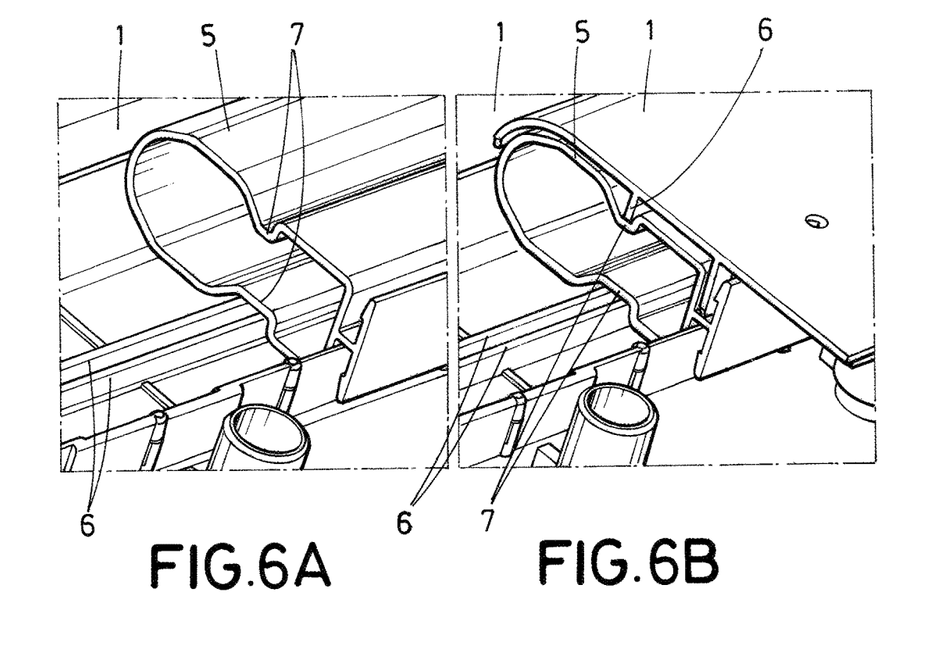

FIGS. 6A and 6B illustrate a guiding profile 5 mounted on the screen 1 of a double shelled sun visor. As can be seen in these figures the guiding profile 5 has an asymmetric external shape and the screen 1 an asymmetrical internal shape. According to the disclosure the external shape of the guiding profile 5 and the internal shape of the screen 1 are such that the guiding profile 5 fits inside the screen 1 only in an exclusive position or orientation. That means that the guiding profile 5 cannot be mounted in a wrong position or orientation inside the screen 1.

In some embodiments the shells 1 comprise first longitudinal ribs 6 to engage with longitudinal grooves 7 of the external shape of the guiding profile 5, as can be seen in FIGS. 6A and 6B.

In some embodiments the screen 1 is made up of two shells and the guiding profile 5 further comprises a clip or arm 8, 8' for attachment to the double shells 1.

Figure 7A:
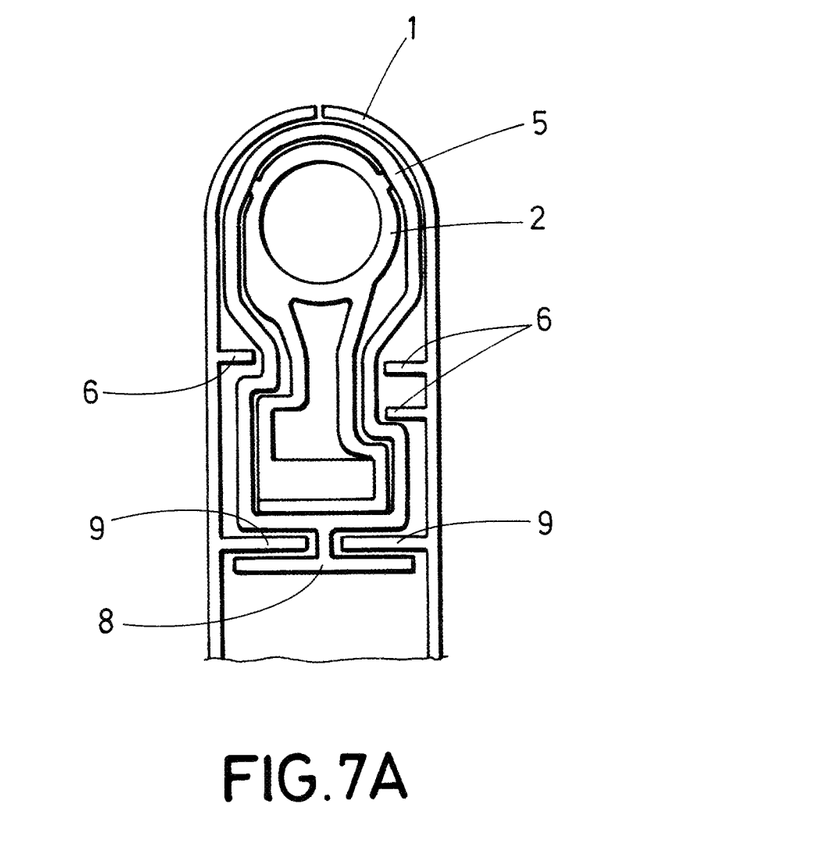
FIGS. 7A and 7B are front views of a slider engaged inside a guiding profile mounted on a double shelled screen. The guiding profile comprises a T shaped clip.
Figure 7B:
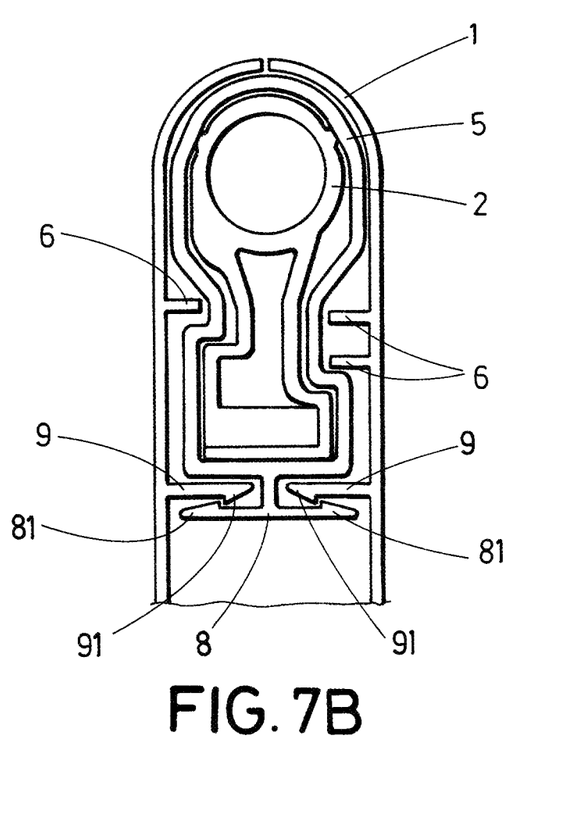

In some embodiments the clip is a T shaped clip 8 with two wings for engagement in second longitudinal ribs 9 of the shells 1, as illustrated in FIG. 7A.

In some embodiments the T shaped clip 8 can comprise elastic ribs 81 to improve the engagement between the guiding profile 5 and the shells 1. The shells 1 can also comprise ribs 91 to improve the engagement.

Figure 8A:
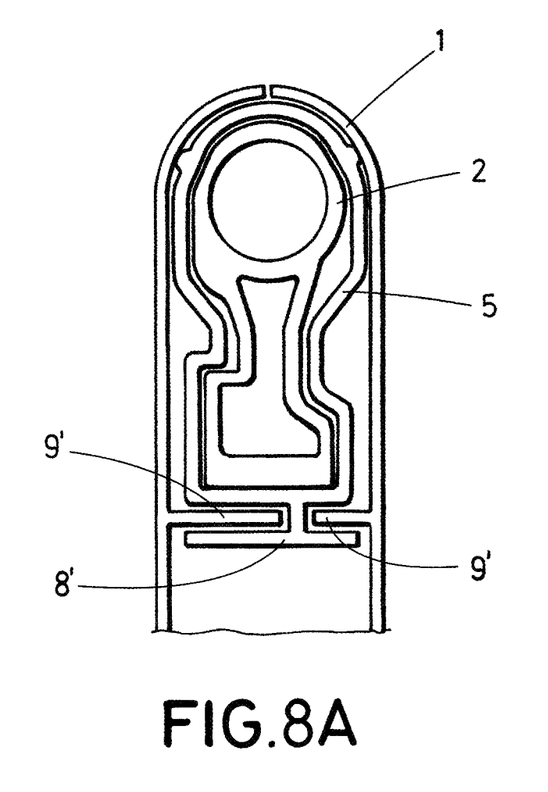
FIGS. 8A and 8B are front views of a slider engaged inside a guiding profile mounted on a double shelled screen. The guiding profile comprises an asymmetric shaped clip.

In FIG. 8A the clip or arm is an L shaped asymmetric clip 8' to fit with asymmetrical longitudinal ribs 9' of the shells 1 such that the guiding profile 5 engages inside the screen 1 only in an exclusive position or orientation.

Figure 8B:
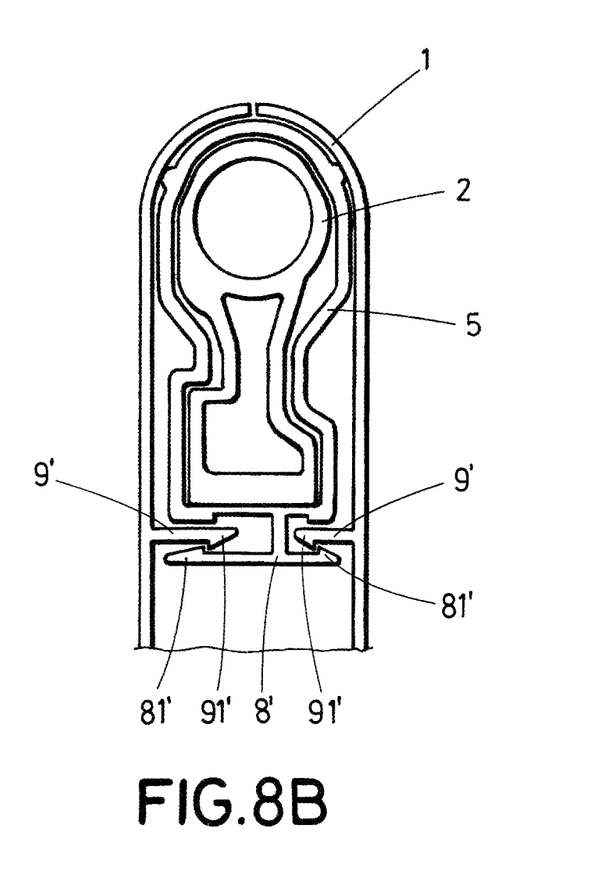

In FIG. 8B the L shaped asymmetric clip 8' comprises elastic ribs 81' to improve the engagement between the guiding profile 5 and the shells 1. The shells 1 can also comprise ribs 91' to improve the engagement.

Figure 9:
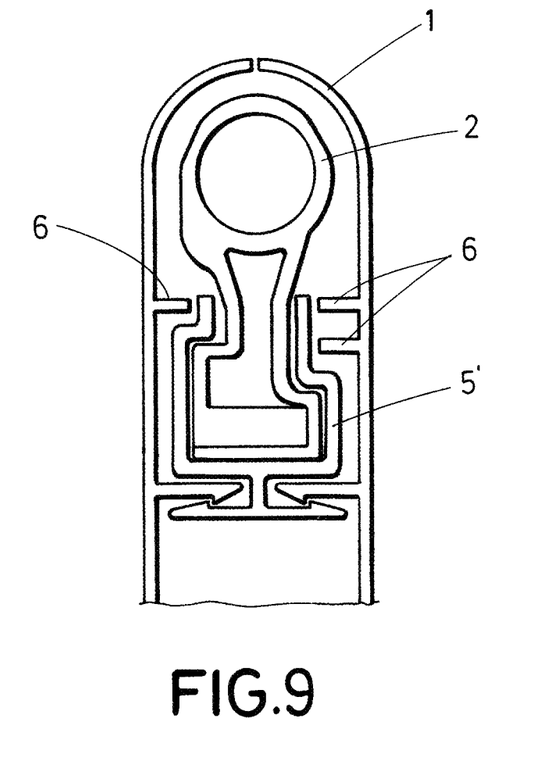
FIG. 9 is a front view of a slider engaged inside a guiding profile mounted on a double shelled screen. The guiding profile is an open guiding profile.

In some embodiments, the guiding profile can be an open guiding profile 5', as illustrated in FIG. 9.

Figure 10:
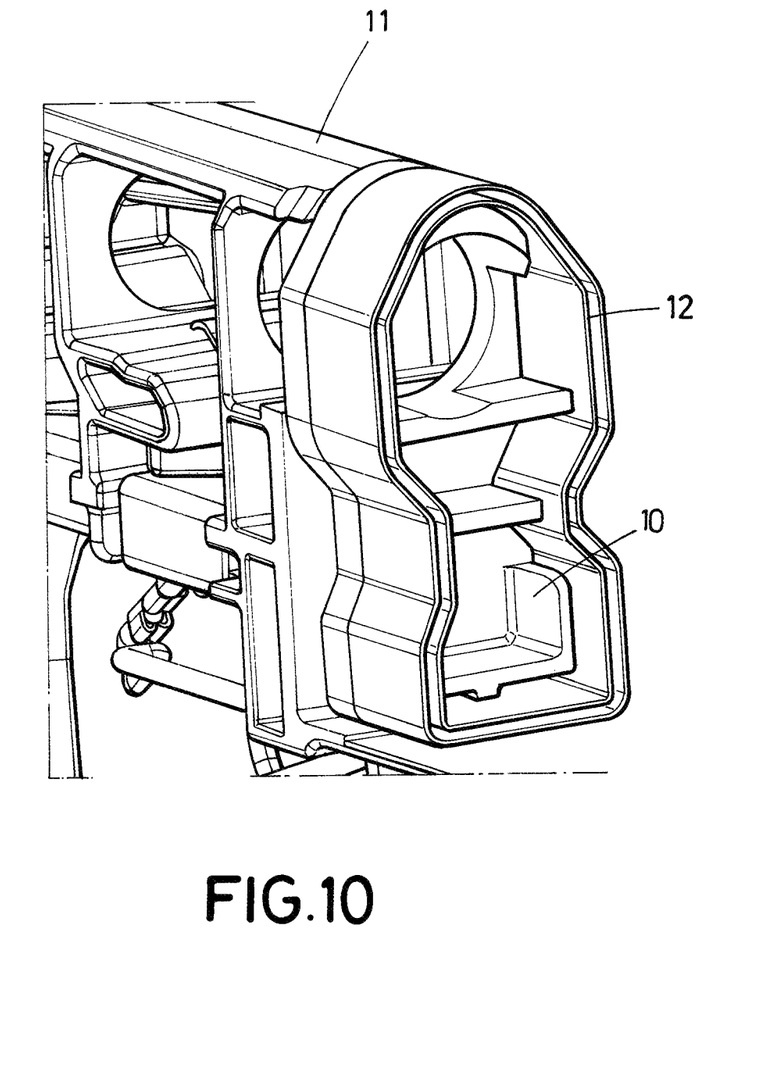
FIG. 10 is a partial perspective of a screen of a skeleton sun visor and an asymmetric edge of a guiding profile.

FIG. 10 illustrates a skeleton screen 11 comprising two asymmetrical structures 10 to engage in asymmetrical edges 12 of the guiding profile such that the guiding profile engages over the asymmetrical structures 10 of the skeleton screen 11 only in an exclusive position or orientation. In FIG. 10 only a part of the skeleton screen 11 is represented and also only one of the asymmetrical edges 12 and asymmetrical structure 10 are illustrated. That means that the guiding profile cannot be mounted in a wrong position or orientation inside the skeleton screen 11.

In this text, the term "comprises" and its derivations (such as "comprising", etc.) should not be understood in an excluding sense, that is, these terms should not be interpreted as excluding the possibility that what is described and defined may include further elements, steps, etc.

Unless otherwise indicated, any ranges referred to in this document include the indicated end points.

The disclosure is not limited to the specific embodiment(s) described herein, but also encompasses any variations that may be considered by any person skilled in the art (for example, as regards the choice of materials, dimensions, components, configuration, etc.), within the general scope of the disclosure as defined in the claims.

The invention claimed is:

1. A sun visor of a vehicle comprising:
   a screen, slidably mounted over a shaft attachable to the vehicle;
   a guiding profile mounted in the screen;
   a slider rotatably mounted over the shaft and housed inside the guiding profile such that the guiding profile can slide longitudinally over the slider to establish a slide on rod function for the sun visor; and
   a detent spring clip attached to the slider and engaging elastically over the shaft of the sun visor such that upon rotation of the screen of the sun visor is possible to establish a shading position and an inoperative position for the sun visor, the sun visor wherein:
   the detent spring clip comprises an asymmetrical shape to fit to an asymmetrical core shape of the slider in a single position,
   the slider comprises an asymmetrical external shape to fit to an asymmetrical internal shape of the guiding profile in a single position, and
   the guiding profile comprises an asymmetrical external shape to fit to an internal shape of the screen in a single position,
   wherein the screen is made up of two shells and the guiding profile comprises a clip for attachment to the shells, wherein the clip is a symmetrical clip to fit with first longitudinal ribs of the shells, wherein the symmetrical clip is a T shaped clip with two symmetrical wings.

2. The sun visor recited in claim 1, wherein the shells comprise second longitudinal ribs to fit with longitudinal grooves of the external shape of the guiding profile.

3. The sun visor recited in claim 1, wherein the clip comprises an elastic rib to engage in ribs of the shells.

4. The sun visor recited in claim 1, wherein the screen is made up of a skeleton having two asymmetrical structures to engage in asymmetrical edges of the guiding profile.

5. The sun visor recited in claim 1, wherein the guiding profile is a closed profile.

6. The sun visor recited in claim 1, wherein the guiding profile is an open profile.

7. A sun visor of a vehicle comprising:
   a screen, slidably mounted over a shaft attachable to the vehicle;
   a guiding profile mounted in the screen;
   a slider rotatably mounted over the shaft and housed inside the guiding profile such that the guiding profile can slide longitudinally over the slider to establish a slide on rod function for the sun visor; and
   a detent spring clip attached to the slider and engaging elastically over the shaft of the sun visor such that upon rotation of the screen of the sun visor is possible to establish a shading position and an inoperative position for the sun visor, the sun visor wherein:
   the detent spring clip comprises an asymmetrical shape to fit to an asymmetrical core shape of the slider in a single position,
   the slider comprises an asymmetrical external shape to fit to an asymmetrical internal shape of the guiding profile in a single position, and
   the guiding profile comprises an asymmetrical external shape to fit to an internal shape of the screen in a single position,
   wherein the screen is made up of two shells and the guiding profile comprises a clip for attachment to the shells, wherein the clip is an asymmetrical clip to fit with asymmetrical longitudinal ribs of the shells, wherein the asymmetrical clip is an L shaped clip with one asymmetrical wing.

8. The sun visor recited in claim 7, wherein the shells comprise first longitudinal ribs to fit with longitudinal grooves of the external shape of the guiding profile.

9. The sun visor recited in claim 7, wherein the clip comprises an elastic rib to engage in ribs of the shells.

10. The sun visor recited in claim 7, wherein the screen is made up of a skeleton having two asymmetrical structures to engage in asymmetrical edges of the guiding profile.

11. The sun visor recited in claim 7, wherein the guiding profile is a closed profile.

12. The sun visor recited in claim 7, wherein the guiding profile is an open profile.

* * * * *